Sept. 9, 1969  H. FRENK  3,466,130
ARRANGEMENT FOR DIGITAL INDICATION
Filed Aug. 25, 1966
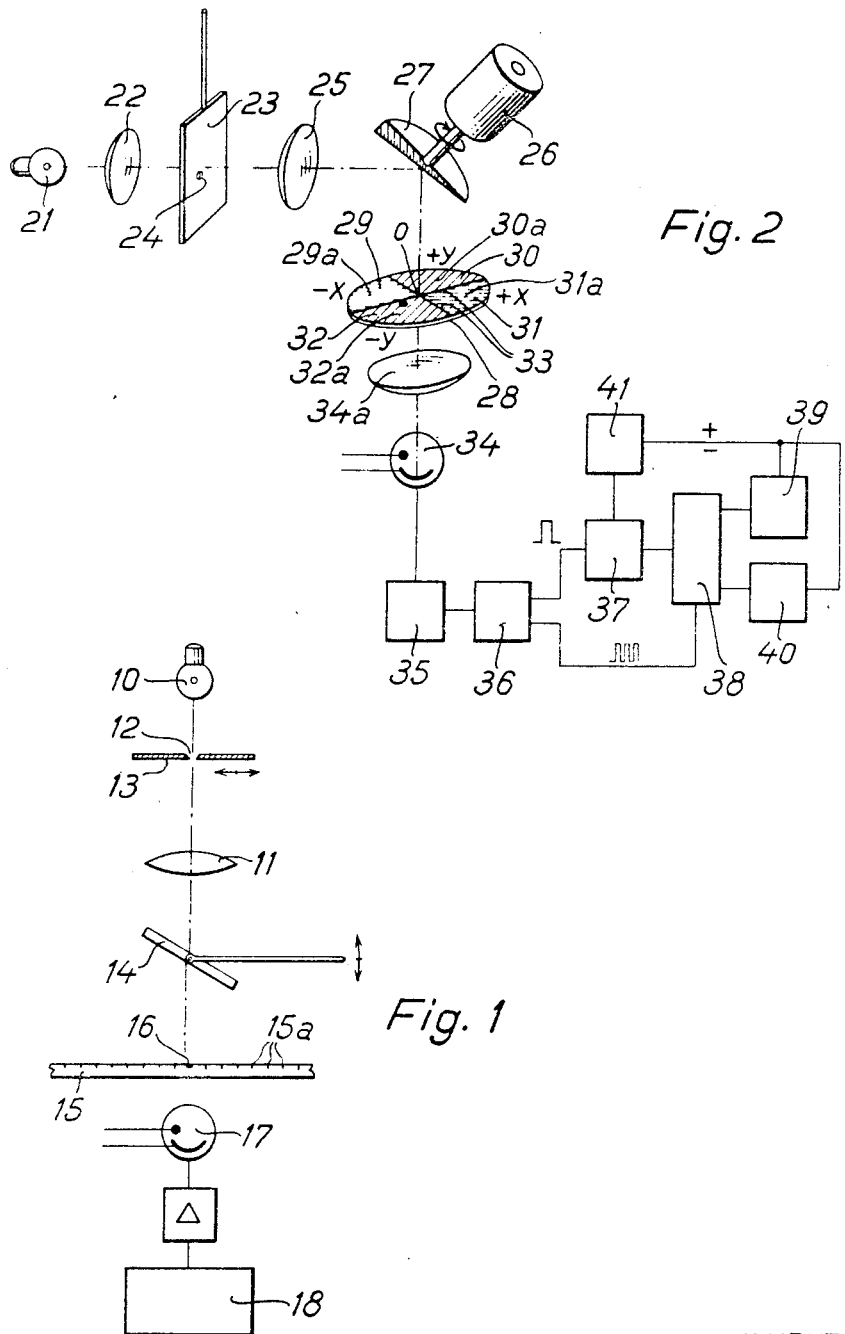
INVENTOR
HELMUT FRENK
BY
ATTORNEY.

3,466,130
ARRANGEMENT FOR DIGITAL INDICATION
Helmut Frenk, Wetzlar, Germany, assignor to Ernst Leitz G.m.b.H., Wetzlar, Germany
Filed Aug. 25, 1966, Ser. No. 575,054
Claims priority, application Germany, Sept. 9, 1965, L 51,596
Int. Cl. G01b 11/04
U.S. Cl. 356—167                    7 Claims

ABSTRACT OF THE DISCLOSURE

This invention provides a device for a digital display of small deviations of the measured object from its initial position in at least one coordinate system. A periodically deflected beam of light is pulse-modulated by a plurality of graduation marks of two different breadths on at least one scale attached to the measure object. Equidistantly spaced thinner marks drive a counter while wider scale field-dividing marks determine the counting sequence and direction.

BACKGROUND OF THE INVENTION

Field of the invention

The invention relates to an arrangement for digitally indicating the position of the neutral point of the oscillation of an oscillating light spot with respect to a zero point in system according to at least one coordinate.

Description of the prior art

In measuring techniques, determining the position of an oscillating marker within an area of observation with respect to a reference marker and representing digitally the magnitude of the distance between the neutral point of the oscillation and the reference marker is a difficult problem.

SUMMARY OF THE INVENTION

The object of this invention is to provide an arrangement wherein the measuring value is already in the digital form, so that special converters or transducers are eliminated.

The present invention embodies an arrangement for indicating the zero or neutral point of the oscillation of an oscillating light spot with respect to a zero point of a system, according to at least one coordinate, this arrangement being characterized in that at least one transparent scale carrier means is provided having at least one line graduation thereon including a plurality of division lines and across which the light spot moves. This graduation has a marker means deviating in its breadth from the lines of the graduation, the center of this deviating marker means corresponding to the position of the zero point of the measuring system.

A forward backward counter is provided which responds, controlled by photoelectric means, when a light spot or dot impinges upon a graduation marker, and whose counting direction is reversed whenever the light spot passes over the marker. If the measuring process is to be conducted in two coordinate directions, four linear divisions assigned to the four quadrants are provided according to the invention. In this connection, the position of the graduations with respect to one another is such that the respective division lines of neighboring graduations are in right angles to each other, the longest division of all graduations intersecting in one point. The marker influencing the counting direction of the counter has the shape of a cross whose axes are congruent with the points of intersection of the graduation lines.

The advantage of the novel arrangement resides in that a conversion of the measuring value into numerical values is not required.

BRIEF DESCRIPTION OF THE DRAWINGS

The invention is illustrated by way of example in the drawings, and is described in the following.

FIGURE 1 is a schematic illustration of an apparatus for determining a measuring value on the basis of one coordinate; and FIGURE 2 of this invention is a schematic representation of an alternate embodiment for determining a measuring value on the basis of two coordinates.

DESCRIPTION OF THE PREFERRED EMBODIMENTS

In the embodiment illustrated in FIGURE 1, a lamp 10 illuminates a diaphragm 13 provided with a slot 12, this diaphragm oscillating in the direction of a measuring coordinate. The luminous slot is reproduced via lens 11 on a transparent graduation carrier 15, via a transparent plane parallel plate means 14 whose angular position in the path of the beam is transferred to the magnitude to be measured. The transparent graduation carrier 15 carries, in addition to the graduation lines 15a, a marker 16 differing in its breadth from the graduation lines. The center line of this marker 16 lies on the zero axis of the system. The amplitude of oscillation of the diaphragm 13 is dimensioned such that the picture of the slot on the graduation carrier sweeps a plurality of division lines. A photoelectrical receiver 17 is positioned in the path of light passing through the graduation carrier 15, and a forward-backward counter 18 is connected after this receiver. This counter is reversed in its counting direction whenever the picture of the diaphragm slot passes the marker 16. From the indication of the counter, the respective position of the plane parallel plate 14 in the beam path and thus the magnitude to be adjusted can be recognized with respect to direction and amount. The functions of diaphragm 13 and plate means 14 may also be exchanged so that plate means 14 oscillates and the deviation of slot 12 is measured.

FIGURE 2 shows an arrangement wherein a lamp 21 illuminates a dot shaped cutout 24 provided in a diaphragm 23, via a condenser 22. This diaphragm is connected with the object to be measured. The picture of the luminous dot which can, if desired, also stem from a self-illuminating source placed on the diaphragm or in any distance, as far as infinity (stars), is reproduced, by means of an optical system on graduation carrier 28. The optical system includes lens 25 as well as a tumbler mirror 27 driven by a motor 26. The graduation carrier 28 is provided with four grids 29–32, assigned to the quadrants, the lines of these grids being at right angles to one another. The longest grid lines 29a to 32a have a common point of intersection, O, congruent with the optical axis of the device. Furthermore, this graduation carrier is provided with a cross-shaped marker 33 positioned in such a manner that the axes of its cross beams intersect or are congruent with the points of intersection of the grid lines. Behind a lens 34a, a photoelectric receiver 34 is connected to the graduation carrier, the pulses of the receiver being amplified in an amplifier 35. A pulse width discriminator 36 connected thereafter separates the broad pulses stemming from the cross marker and feeds these pulses to a flip-flop stage 37 whose output actuates a gate circuit 38. To this circuit there are furthermore applied the narrow pulses coming from the grid lines, and the gate circuit feeds these pulses alternately, influenced by the flip-flop output, to the x- and y-counters 39 and 40, respectively. A second flip-flop stage 41 connected behind the first flip-flop stage insures that the arithmetical sign changes with each second wide pulse. For monitoring the circuit, further gate stages, not illustrated, can be provided, which are controlled by a separate, relatively simple position scanning of the circling light dot. Thereby the erroneous interchanging of coordinates and/or arithmetical signs by incorrect pulses is avoided. Naturally for controlling the forward-backward counting the counter 18 of FIGURE 1 also contains analogous circuits like 36, 39 and 41, not shown.

I claim:

1. Apparatus for digitally indicating the position of the neutral point of oscillation of an oscillating light spot means with reference to a zero point in a measuring system according to at least one coordinate, comprising at least one transparent graduation carrier scale means having at least one marker means and a plurality of division lines symmetrically spaced relative to said marker means, a moving light spot means above the line graduation, said marker means deviating with respect to its breadth from said division lines, the center of said marker means corresponding to the position of the zero point of the measuring system, a photoelectric receiver means positioned in the path of light passing through said graduation scale means from the moving light spot means, and a forward-backward counter means connected to the photoelectric receiver means for actuation thereby when light from the light spot means impinges upon one of said plurality of division lines the forward-backward counter means including means for automatically reversing the counting direction of the counter when the light from the light spot means passes over the marker means.

2. The apparatus of claim 1 wherein the moving light spot means includes a light source and a diaphragm means moving between the said light source, and said graduation carrier scale means at an angle to said spot means to scan said division lines, said division lines being spaced parallel to and equidistantly from each other.

3. The apparatus of claim 2 wherein a plane parallel plate means is disposed between the oscillating diaphragm and the line graduation for reproducing the light from the diaphragm on the line graduation, whereby the angular position of the plane parallel plate means can be determined by the forward-backward counter means.

4. The apparatus of claim 2 wherein an oscillating plane parallel plate means is disposed between the diaphragm and the line graduation for reproducing the light from the diaphragm on the line graduation, whereby the linear position of the diaphragm can be determined by the forward-backward counter means.

5. The apparatus of claim 1 wherein the transparent graduation carrier means has four line graduations, each assigned to one of four quadrants, the respective division lines of graduation in adjacent quadrants are at right angles to each other, a division line in each graduation intersects in one point with a division line in each of the other graduations, and the marker means has the shape of a cross whose axes are congruent with the points of intersection of the graduation lines in adjacent quadrants.

6. The apparatus of claim 5 wherein the moving light spot means includes a light source and a diaphragm means moving between a beam of light from the light source and optical means for reproducing the light from the diaphragm on the graduation carrier means.

7. The apparatus of claim 6 wherein the optical means includes a tumbler mirror with drive means connected thereto.

References Cited

UNITED STATES PATENTS

| | | | |
|---|---|---|---|
| 2,393,186 | 1/1946 | Potter | 250—236 XR |
| 2,489,305 | 11/1949 | McLennan | 250—235 XR |
| 2,977,584 | 3/1961 | Siegel | 250—219 XR |
| 3,024,986 | 3/1962 | Strianese et al. | 250—236 XR |
| 3,100,846 | 8/1963 | Burkhardt. | |
| 3,180,991 | 4/1965 | Dixon | 250—236 XR |
| 3,254,227 | 5/1966 | Hock | 250—235 |
| 3,259,751 | 7/1966 | Sachs | 250—236 |

JEWELL H. PEDERSEN, Primary Examiner

T. MAJOR, Assistant Examiner

U.S. Cl. X.R.

250—203